Nov. 3, 1942. F. G. VON HOORN Re. 22,218

CIRCUIT BREAKER

Original Filed June 18, 1937 3 Sheets-Sheet 1

Inventor:
Fred G. von Hoorn,
by Harry E. Dunham
His Attorney.

Nov. 3, 1942. F. G. VON HOORN Re. 22,218

CIRCUIT BREAKER

Original Filed June 18, 1937 3 Sheets-Sheet 2

Inventor:
Fred G. von Hoorn,
by Harry E. Dunham
His Attorney.

Nov. 3, 1942. F. G. VON HOORN Re. 22,218

CIRCUIT BREAKER

Original Filed June 18, 1937 3 Sheets-Sheet 3

Inventor:
Fred G. von Hoorn,
by Harry E. Durham
His Attorney.

Reissued Nov. 3, 1942

Re. 22,218

UNITED STATES PATENT OFFICE 22,218

CIRCUIT BREAKER

Fred G. von Hoorn, Bridgeport, Conn., assignor to General Electric Company, a corporation of New York Original No. 2,150,013, dated March 7, 1939, Serial No. 148,937, June 18, 1937. Renewed April 25, 1938. Application for reissue September 23, 1941, Serial No. 412,010

39 Claims. (Cl. 200—116)

My invention relates to circuit breakers, more particularly to thermal circuit breakers and has for its object a simple, reliable and inexpensive device of this character.

This invention, which is an improvement of the circuit breaker described and claimed in my copending application, Ser. No. 122,581, filed January 27, 1937, has special application to circuit breakers of small physical size such as used in branch electric lighting circuits or as entrance circuit breakers for the building. The device is operable manually to open and close the circuit and also responsive to excessive current conditions to open the circuit independently of the operating handle. Circuit breakers embodying my invention may be constructed with relatively small overall dimensions and at low cost while being capable of interrupting alternating currents of short circuit magnitude, for example, on the order of 5000 to 10,000 amperes or more and at lighting circuit voltages such as 125 volts or more.

In carrying out my invention in one form I provide a switch member or blade which is mounted for pivotal movement about a plurality of points. One end of this switch member is normally held by a current responsive element, while the other end carries a switch contact. The switch member is normally operated by a handle having a face cooperating with the switch member at an intermediate point thereof. It is biased by a spring to an open circuit position and is held by the handle in the closed circuit position through the agency of a spring on the switch member itself. When the handle is moved to open and close the circuit, the switch member pivots about the end which is held by the current responsive element, while on overload, when this end is released, the switch blade pivots about the operating handle in moving to the open circuit position, the handle being moved thereby towards its open circuit position.

I have also provided means for automatically returning the switch member, when it is released by the current responsive element, to a position in which it is secured by the current responsive element when the element has cooled. I furthermore provide a common operating handle arrangement for the simultaneous operation of two circuit breakers arranged side by side, this arrangement likewise giving an indication when either one or both of the circuit breakers opens on overload.

Figure 1:
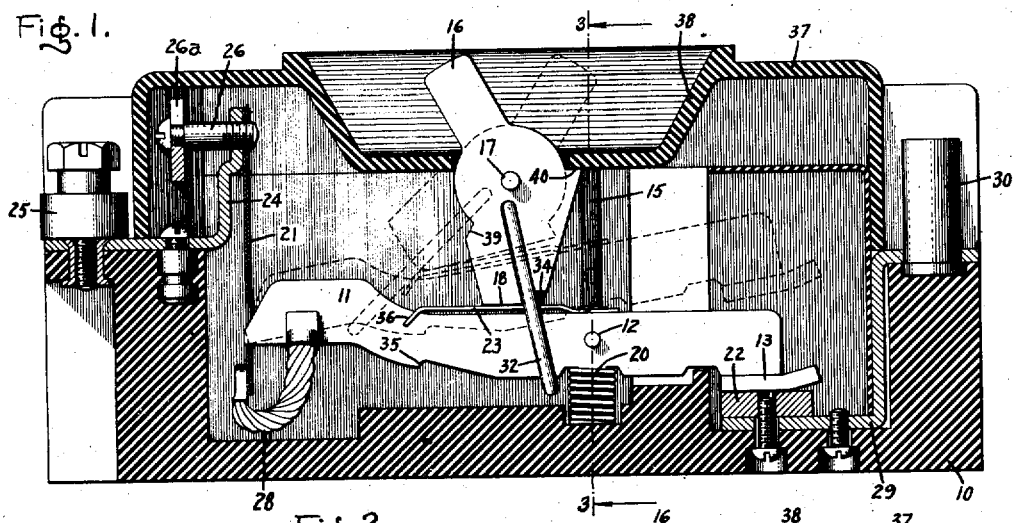
Figure 2:
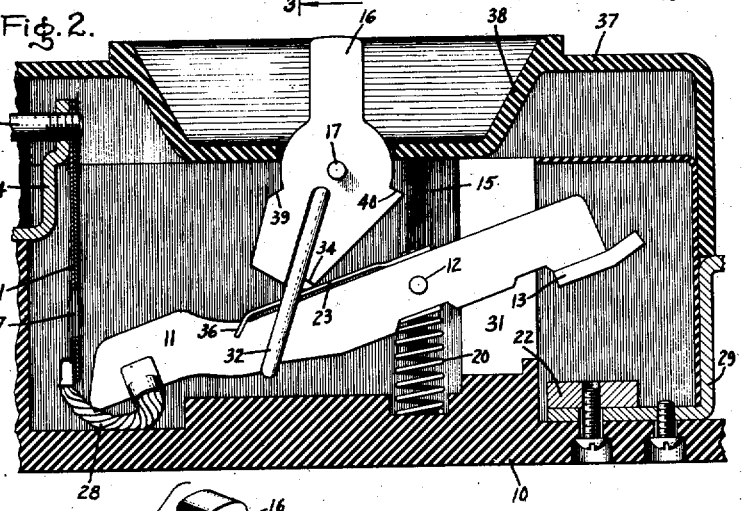
Figure 3:
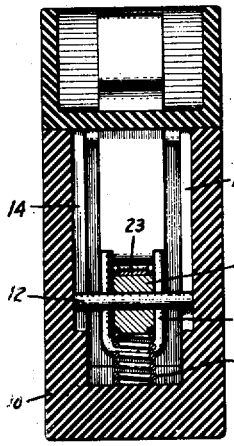
Figure 4:
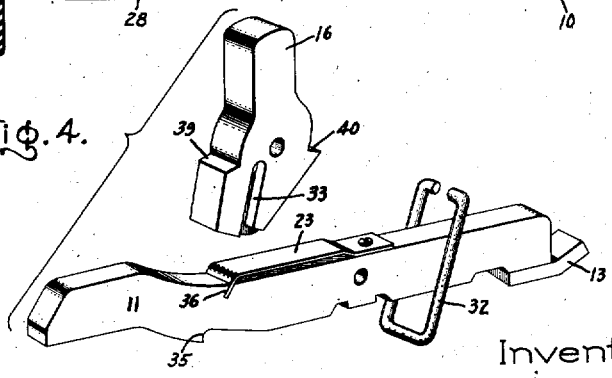
Figure 5:
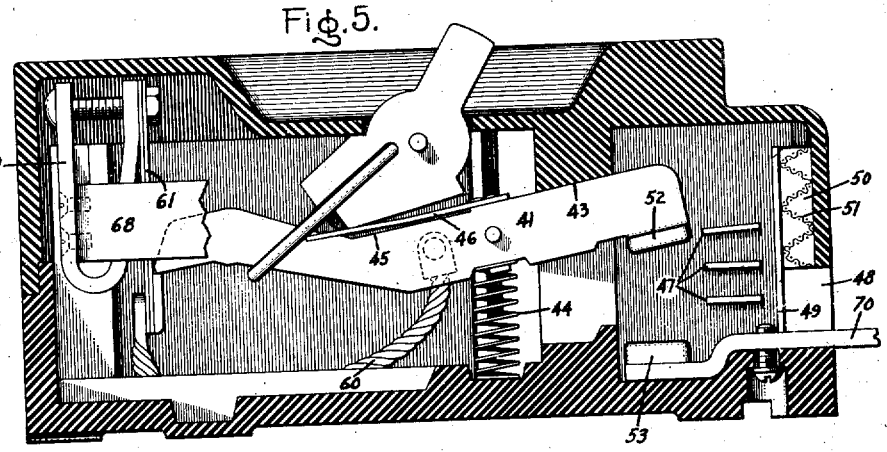
Figure 6:
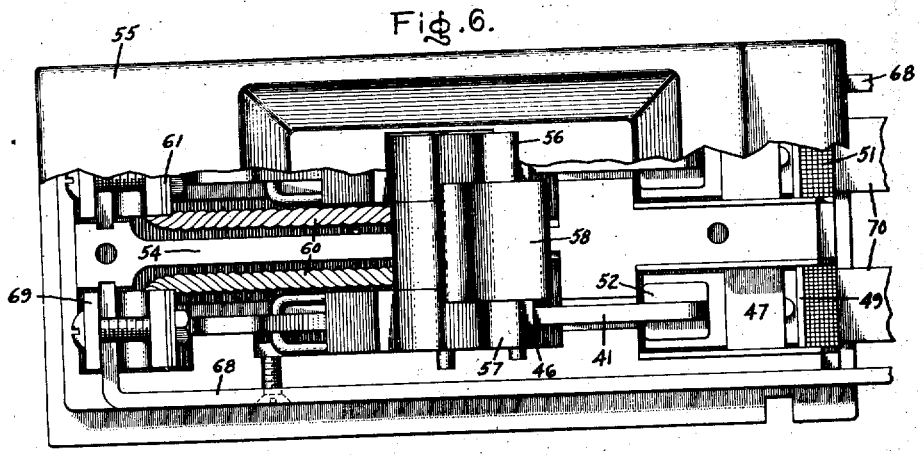
Figure 7:
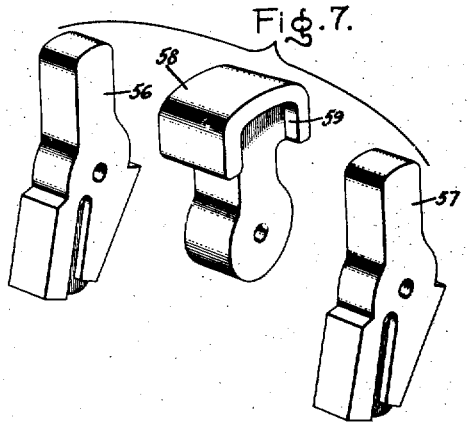
Figure 11:
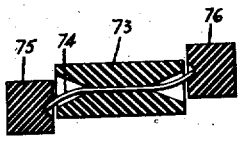
Figure 12:
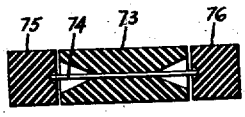
Figure 8:
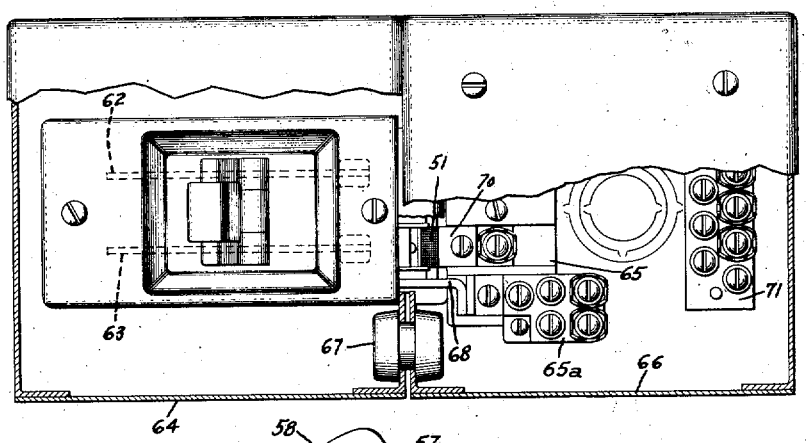
Figure 9:
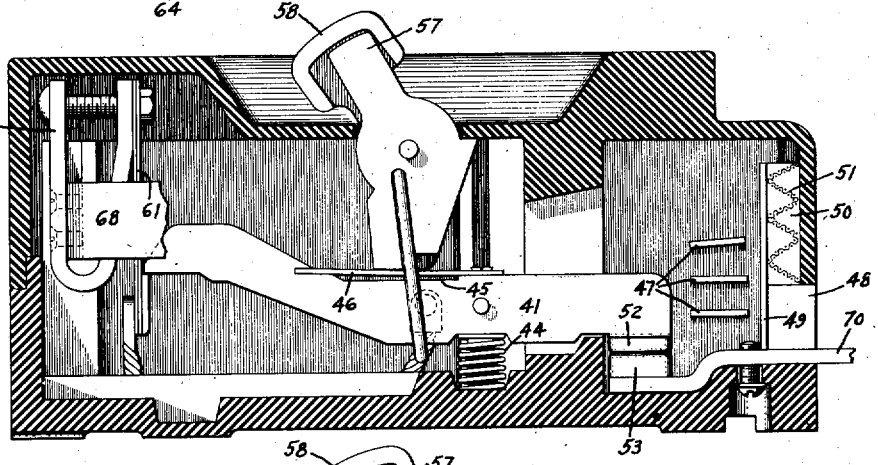
Figure 10:
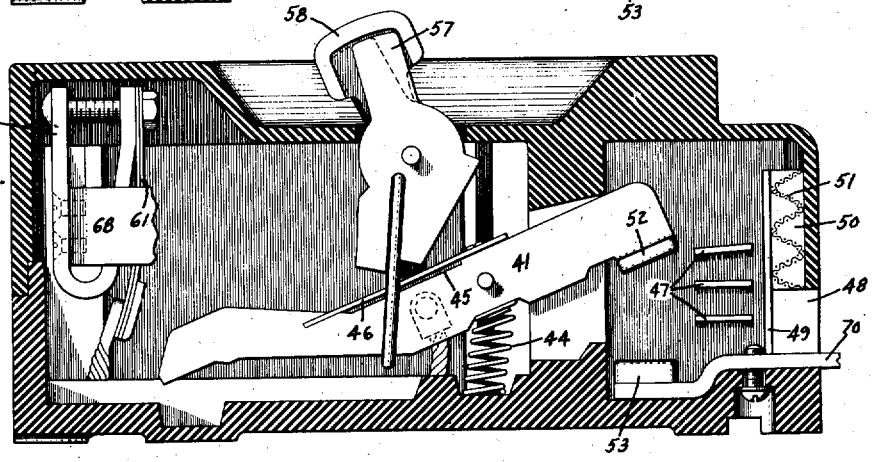

For a more complete understanding of my invention reference should be had to the accompanying drawings, Fig. 1 of which is the longitudinal sectional view of a circuit breaker embodying my invention showing the parts in full in closed circuit position and dotted in manual open circuit position; Fig. 2 is a fragmentary view similar to Fig. 1, but showing the breaker in overload tripped open circuit position after operation of the overload responsive means; Fig. 3 is a sectional view taken along the line 3, 3 of Fig. 1 looking in the direction of the arrows; Fig. 4 is a view in perspective of the switch member and operating handle with the handle disassembled; Fig. 5 is a longitudinal sectional view showing a modified form of my invention in the open circuit position; Fig. 6 is a plan view with part of the cover cut away showing an assembly of two circuit breakers such as shown in Fig. 5 with a common operating member; Fig. 7 is an exploded view of the common operating member for the two circuit breakers of Fig. 6; Fig. 8 is a plan view with part of the cover cut away on a reduced scale showing an assembly in a metal box or cabinet of two circuit breakers such as shown in Figs. 5 and 6 together with the connection blocks for the electric circuit; Fig. 9 is a view similar to Fig. 5, but showing the circuit in closed position; Fig. 10 is a view similar to Fig. 9, but showing the circuit breaker in the overload tripped open position, while Figs. 11 and 12 are detail views in section of a modified form of common actuating means.

Referring to the drawings, I have shown my invention as embodied in a circuit breaker of quite small physical size and such as might be used as an entrance switch and circuit breaker for a dwelling house. Of course the size and characteristics of the device will be selected to take care of desired normal current and overload current. It is especially adapted for use in alternating current circuits and in such circuits it performs as well the safety function of a fuse interrupting short circuit currents of 5000 to 10,000 amperes or more depending on the size of the breaker.

Referring to Figs. 1 to 4 inclusive of the drawings, my invention in one form comprises an electrically insulating base or casing 10 which may be molded from a suitable plastic insulating material such as a phenolic condensation product. In this base is mounted a switch member or blade 11 of the floating type, i. e., it is mounted for pivotal movement selectively about a plurality of points. As shown, the member 11 is mounted by means of a transversely extending guide pin 12 near its middle and nearer the end bearing a movable switch contact 13.

This guide pin 12 has its ends sliding in grooves or slots 14 and 15 provided in opposite walls of the casing 10, the slots being perpendicular to the bottom of the casing. The switch member is operated between its closed position, shown in Fig. 1, and its open position, shown dotted in Fig. 1, by means of a handle 16 supported on a pivot 17. This handle has a plane operating projection or cam face 18 at a predetermined distance from the pivot 17, and which engages the switch blade to move it between its open and closed positions against the bias of a helical spring 20 located under the switch blade below the guide pin 12 and exerting a pressure on the switch blade in an upward direction as viewed in the drawings, i. e. in the direction of the grooves or slots 14 and 15. Thus the spring biases the switch blade to the open position, the blade moving about its left-hand end which is secured by a current responsive element shown as a bimetallic thermostatic strip 21.

Thus, when the handle is moved to the closed position, as shown in Fig. 1, the projection or cam face 18 forces the switch blade downward to bring the contact 13 carried by it into engagement with the stationary contact 22. When the handle is moved toward the right to the off position, as shown in Fig. 1, dotted, the cam face 18 is moved away from the upper edge of the switch blade so as to allow the switch blade to be moved to the open position by the spring 20. It will be noted that the face 18 is so disposed that a force perpendicular thereto at its middle passes substantially through the pivot 17 whereby the force applied by the switch member secures the handle in its closed circuit position.

To assure a good electrical contact when in the closed circuit position, a straight spring strip 23 is mounted on the upper edge of the switch blade and it is with this spring that the handle 16 engages. This straight spring 23 is stronger than the biasing spring 20 and consequently holds the contacts 13 and 22 into engagement with each other with a resilient force thereby assuring a good contact and providing for greater manufacturing tolerances in the parts and for subsequent wear.

The bimetallic thermostatic strip 21 is mounted at its upper end on an electrically conducting support 24 which leads to a terminal connector 25 on the exterior of the switch casing. By means of an adjustment screw 26 on a support 26a the support 24 may be bent slightly either to the left or to the right to adjust the position of the lower end of the bimetallic strip and therefore its current rating, i. e. the current value in response to which the strip is distorted laterally far enough to release the switch member on overload. The transverse support 26a may be secured by inserting its ends in slots (not shown) provided for it in the opposite walls of the casing. As shown, the thermostatic strip is provided with an aperture 27 adjacent its lower end in which the left-hand end of the switch blade extends and rests on the lower edge of the bimetallic strip. A flexible electrical connection 28, shown as a cable, is provided between the lower end of the bimetal strip 21 and the switch blade.

Thus, referring to Fig. 1, a circuit may be traced through the circuit breaker from the terminal 25, the connector 24, the bimetallic element 21, the flexible conductor 28, the switch member 11, contacts 13 and 22, connector strap 29 and a second terminal 30 on the exterior of the casing. The switch member is guided by opposite walls of the casing near the contact 13, one of these walls 31 being shown. In other words, the casing is just wide enough at this point to permit free movement of the switch blade while holding the switch blade in its operative position.

As shown in Fig. 4, the handle 16 is provided for guiding resetting purposes with a member shown as a loop portion 32 made of a steel wire, the upper ends of the wire being turned inward towards each other and each extending into an aperture provided for it in the handle. Furthermore, a slot or groove 33 is provided on each side of the handle in which the upper ends of the loop 32 lie. In other words, the handle 16 is somewhat thicker than the switch blade 11 so as to provide material for the walls of the grooves 33, the loop 32 closely embracing the switch member, although being loose enough for free movement.

As previously indicated, the purpose of the loop extension 32 on the handle is to guide and reset the switch member 11 after it has been released on overload by the thermal element 21. In such case, the switch member is moved by the helical spring 20 to the open position shown in Fig. 2. Thus when the left-hand end of the member is released by the thermostat that end is thrown down suddenly by the force exerted by the spring 20 and comes to rest against the bottom of the casing. During this movement, the switch blade pivots about the corner 34 of the handle at one edge or end of the cam faces 18. As the left-hand end of the switch member moves downward the bias on the handle becomes applied along a line extending to the left of the pivot pin 17, the corner 34 on the handle being rounded to bring about this effect so that the handle is moved toward its open circuit position until it is brought to rest in an intermediate position by engagement between the loop member 32 and a suitable projection 35 on the lower edge of the switch member. These positions of the parts are shown in Fig. 2. To close the switch, assuming that the bimetal has cooled sufficiently to move back in position to latch the left-hand end of the switch blade, the handle is first moved farther toward the right to the full open circuit position whereby the loop 32 by engagement with the projection 35 carries the left-hand end of the switch blade upward and latches it on the thermostat. Actually the left-hand end of the switch blade is moved upward somewhat further than necessary to a point where the loop 32 slips over the projection 35, allowing the handle to move to its full off position, the left-hand end of the switch blade then dropping somewhat if necessary into engagement with the bimetallic strip. The parts are now in the position shown in dotted lines in Fig. 1 which is the same as the manual open circuit position.

As clearly shown in Fig. 4, the spring 23 is secured to the switch member 11 in parallel spaced relation therewith, one end being bent downward and lying in a groove 36 in the switch blade, while the other end is offset downward and secured to the switch blade by a screw.

A suitable cover 37 made of a molded insulating compound is provided. This cover is provided with a recessed portion 38 adjacent the handle and extending downward near the pivot 17 in close relation with the handle, a suitable aperture being provided through which the handle extends. The handle is provided with shoulders 39 and 40 forming stops which engage the lower edge of the cover in the opened circuit and closed circuit positions respectively to prevent overtravel of the handle, especially in the open position shown in dotted lines in Fig. 1.

Figs. 5 to 10, inclusive, show a modified form of my invention in which the switch member 41 is automatically reset when the switch is opened on overload. This form of my invention is also especially adapted for mounting in groups, particularly in pairs in a suitable cabinet or entrance box 64, as shown in Fig. 8.

This form of my invention is fundamentally the same as that shown in Figs. 1 to 4, inclusive, with the principal difference that an abutment 43 is provided in the casing, preferably secured to the cover, against which the right-hand end of the switch member is brought to rest when the switch is opened on overload. Thereafter the left-hand end of the switch member is forced upward by the spring 44 about the abutment 43 as a pivot until it is in position to be secured by the thermostat when the latter has cooled. The parts are then in the open position shown in Fig. 5, which is the same as the manual open position. In this form the reset projection 35 on the lower edge of the switch member is omitted.

In the event, however, that the floating blade or contact bar 41 is not reset or returned automatically after opening in response to an overload to the position shown in Fig. 5 with its left-hand end in latching engagement with the thermostat, the handle can be moved manually to the open circuit position shown in Fig. 5 thereby to raise the left-hand end of the contact bar and reset it on the thermostat as described in connection with Figs. 1 to 4 inclusive. During this emergency manual resetting operation, the wire loop forming a part of the handle engages and slides along the lower left-hand edge of the contact bar thereby lifting the bar, the lower left-hand edge of the bar being formed and constituting formation means to effect this lifting movement.

As described in connection with Figs. 1 to 4 inclusive, the handle is moved to push or cam the contact bar between its "off" or open circuit position of Fig. 5 and its "on" or closed circuit position of Fig. 9. In opening automatically in response to overload, the trip bar or actuated part is moved first counterclockwise by the spring 44 to an intermediate or "trip" position such as shown in Fig. 10, trip-free of the handle, and then the spring reverses the movement of the bar to the "off" position of Fig. 5. The handle is moved at the same time to its "off" position. In the event that the handle is held manually in its "on" position or held in some intermediate position manually or by the interlocking common operating handle 58, as shown in Fig. 10, the bar comes to rest in this intermediate position. When the handle is released thereafter the spring 44 moves the left-hand end of the contact bar upward to relatch it on the thermostat and at the same time moves the handle to its "off" position.

It will be observed that in this form of my invention the switch member 41 is extended upward somewhat at the left-hand end to form an elongated recess 45 over which the spring 46 extends. This provides for a straight spring strip which is an advantage from the manufacturing standpoint.

In this form of my invention I have also provided a plurality of arc extinguisher plates 47, three being shown. These plates are made of magnetic material, such as steel, and are placed in spaced relation opposite the contact carrying end of the switch member. Moreover, the casing is provided with a vent opening 48 opposite this end of the switch member, a barrier wall 49 which may be formed of a suitable electrically insulating material such as a fiber being provided between the switch blade and the vent opening. This wall 49 extends upwards to a point near the top of the casing so as to form an exhaust channel 50. In this channel is placed a strip 51 of wire gauze material which is bent in zig-zag formation, as shown. The object of the gauze material is to cool the gases escaping from the switch when it opens and prevent sparks from escaping.

Therefore, when the switch opens an appreciable gas pressure is created by the heat of the arc in the chamber surrounding the switch contacts 52 and 53. These gases escape through the opening 50 and in so doing the arc is blown in between the extinguisher plates 47. The effect of the plates is to break up the arc and to cool it thereby quickly extinguishing it. The casing is substantially gas tight except for the opening 50 and consequently the gases are compelled to escape through this opening.

In Fig. 6 I have shown the arrangement in a unit of two circuit breakers. To economize in space the two breakers may be mounted in a single casing provided with a single dividing wall 54 and a single cover 55. Between the two operating handles 56 and 57 a third dummy or operating member 58 is provided, this handle being mounted on the same common pivot with the handles 56 and 57. Moreover, the circuit breakers are arranged with similar ends adjacent each other so that the handles move in parallel relation between their open circuit and closed circuit positions. As shown more clearly in Fig. 7 the upper end of the operating member 58 is enlarged into a rectangular head so as to overlap the upper end of the adjacent handle on each side, a recess 59 formed by a pair of flanges being provided on each side to receive the upper end of the adjacent handle. This recess, however, is considerably wider than the width of the handle for the purpose of permitting limited independent movement of the handle in the event of opening of a single circuit breaker on overload. This provides for a slight movement of the handle 58 also in that event to indicate that one of the switches has tripped open. Thus when the two circuit breakers are either both open, as shown in Figs. 5 and 6, or both closed, as shown in Fig. 9, the central handle 58 moves by its own weight to extreme right-hand and left-hand positions respectively, as indicated in the drawings. This position of the middle handle 58 indicates that the two switches are either both open or both closed as the case may be. In the event that one switch opens on overload, however, its handle moves towards the off position somewhat carrying along the central handle 58, as indicated in Fig. 10, until the handle 58 is brought to rest against the handle of the other circuit breaker. It should be noted that the force of the spring 44 tending to throw the handle toward its open circuit position on overload opening is much less than the force holding the handle when the switch is closed. Therefore when one circuit breaker opens, its handle is not biased strongly enough to open the other circuit breaker. Thus in Fig. 10 the handle 57 has moved toward the open position until it is brought to rest by the central handle 58, the switch meanwhile moving to the open position indicated. This carries the central handle 58 back towards the open position somewhat and indicates that one of the circuit breakers is open.

In this form of my invention the flexible conductor 60 connecting the thermostat 61 with the switch member 41 is longer than that shown in Figs. 1 and 2, connection being made with the switch member at substantially the middle point thereof. This decreases the bending of the conductor during the movements of the switch member and further eliminates to a large extent interference with the movements of the switch member.

In Fig. 8 I have shown a typical main service breaker installation for a dwelling house. Two circuit breakers 62 and 63, preferably constructed as shown in Figs. 6, 7, 9 and 10, are mounted in a steel box 64 while connection or terminal blocks 65 and 65*a* for each breaker are mounted in a second box 66 adjacent thereto. The two boxes are secured together by a conduit and bushing connection 67 and they may be further secured by mounting them on a common support.

To facilitate this assembly, the two terminals of the circuit breaker are brought out at the same end of the circuit breaker. Referring to Figs. 5 and 6, a connection strap 68 leads from the thermostat support 69 along the outer side of the breaker to the right-hand end. The other terminal 70 from the stationary contact 53 is brought out just below the vent opening 48. These terminals 68 and 70 are connected, as shown in Fig. 8, to the connection blocks 65 and 65*a* respectively.

This arrangement is especially suitable for a three wire neutral service connection. The three wires will be brought into the box 66 through a suitable knockout. The neutral wire is connected to a terminal block 71 in the box 66, which terminal block is grounded to the box and it will be also grounded preferably to a water pipe or other convenient grounding medium. This grounding connection to the water pipe may be made by running a ground wire from the terminal block 71 through the conduit 67 and thence out of the box 64 through a suitable knockout.

The two ungrounded service wires are connected respectively to the breaker terminal blocks 65, only one of which is shown. The supply circuits will be run out of the box 66 from the two terminal blocks 65*a*, only one of which is shown, and from the neutral terminal block 71 as desired.

Referring to Figs. 11 and 12, the two handles and the central operating member may be resiliently held in alinement with each other by means of a suitable spring. As shown, the central operating member 73 is provided with a transverse aperture for a wire spring 74, the aperture being enlarged at each end to provide for flexing of the spring at each end. The ends of the spring seat respectively in depressions provided for them in the outside handles 75 and 76. The spring being a straight wire, normally holds the two outside handles in alinement with the central operating member, as shown in Fig. 12. It will be understood that the spring wire 74 is inserted at some suitable point above the pivot axis of the three members preferably about half way between the axis and the ends of the members.

In thus alining the members it will be observed that the spring wire holds each outside handle 75 centrally of the depression provided for it in the side of the central operating member i. e., centrally of the depression 59 of Fig. 7. Except for the addition of the spring the three members may be constructed as shown in Fig. 7. This spring 74 is quite fragile and has sufficient force only to hold the three parts in alinement. It does not offer any substantial resistance to movement of either one of the handles 75 and 76 in the event that the circuit breaker corresponding to one of these handles is opened on overload. Thus the handles in that event assume the relative positions shown in Fig. 10, as indicated in Fig. 11.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A circuit breaker comprising a switch member, a handle of electrically insulating material, means pivotally mounting said handle, a spring biasing said switch member against said handle, said handle being provided with a face located a predetermined distance from the pivot of said handle for engagement with said switch member in dependence upon the position of said handle, a spring strip secured to said switch member and having a portion in spaced relation with said switch member forming a bearing surface for said handle, load responsive means securing one end of said switch member whereby movement of said handle moves said switch member about said secured end, and circuit controlling means operated by said switch member.

2. A circuit breaker comprising a support provided with oppositely disposed parallel grooves, a switch member movable on said support, transversely extending guide members secured to said blade intermediate the ends of said blade and slidable in said grooves, a handle of electrically insulating material, means pivotally mounting said handle, a spring biasing said switch member against said handle, said handle being provided with a face located a predetermined distance from the pivot of said handle for engagement with said switch member in dependence upon the position of said handle, a spring strip secured to said switch member and having a portion in spaced relation with said switch member forming a bearing surface for said handle, thermal load responsive means securing one end of said switch member whereby movement of said handle moves said switch member about said secured end, and circuit controlling means operated by said switch member.

3. A circuit breaker comprising an electrically conducting switch member, means mounting said switch member for pivotal movement about a plurality of points, a current responsive device normally securing one end of said switch member, a contact carried by the other end of said switch member, electrical connections connecting said switch member in the circuit of the breaker, spring means biasing said switch member to an open circuit position about said current responsive device as a pivot, a handle made of electrically insulating material engaging said switch member to move it between its open and closed circuit positions, said spring moving said switch member about said handle to its open circuit position when said switch member is released by said current responsive device, and a stop engaged by the movable end of said switch member and about which said spring moves said switch member to a position to be secured by said current responsive device.

4. A circuit breaker comprising an electrically conducting switch member, means mounting said switch member for pivotal movement about a plurality of points, a contact carried by a normally movable end of said switch member, a contact carried by the other end of said switch member, electrical connections connecting said switch member in the circuit of the breaker, a current responsive device normally securing the other end of said switch member, a spring biasing said switch member to its open circuit position about said current responsive device as a pivot, a handle made of electrically insulating material engaging said switch member to move it between its open and closed circuit positions, said spring moving said switch member about said handle as a pivot to its open circuit position when said switch member is released by said current responsive device, and a stop engaged by the movable end of said switch member in its open circuit position and about which said spring moves said switch member to a position to be secured by said current responsive device.

5. A circuit breaker comprising a switch member, a contact cooperating with one end of said switch member, a current responsive thermostat normally securing the other end of said switch member, a spring biasing said switch member to an open circuit position about said thermostat as a pivot, a handle of electrically insulating material, means pivotally mounting said handle at a point intermediate the ends of said switch member and in the path of movement of said switch member so that said switch member is biased by said spring toward said pivot point, said handle being provided with a face located a predetermined distance from the pivot of said handle for engagement with said switch member in dependence upon the position of said handle to thereby move said switch member between its open and closed circuit positions, said switch member when released by said thermostat being moved by said spring about said handle as a pivot to its open circuit position, and a stop engaged by said switch member in its open circuit position about which said spring moves said switch member to a position to be secured by said thermostat.

6. A circuit breaker comprising a switch member, a contact cooperating with one end of said switch member, a current responsive thermostat normally securing the other end of said switch member, a spring biasing said switch member to an open circuit position about said thermostat as a pivot, a handle of electrically insulating material, means pivotally mounting said handle at a point intermediate the ends of said switch member and in the path of movement of said switch member, said handle being provided with a face located a predetermined distance from the pivot of said handle for engagement with said switch member in dependence upon the pivotal position of said handle to thereby move said switch member between its open and closed circuit positions, said switch member when released by said thermostat being moved by said spring about one edge of said face as a pivot to its open circuit position whereby said handle is thrown to its open circuit position, and a stop engaged by said switch member in its open circuit position about which said spring moves said switch member to a position to be secured by said thermostat.

7. A circuit breaker comprising a switch member, means mounting said switch member for pivotal movement about a plurality of points, a current responsive device normally securing one end of said switch member, a spring biasing said switch member to an open circuit position about said end as a pivot, and a handle having a face movable into engagement with said switch member to thereby move said switch member to a closed circuit position against the force of said spring, said face being so disposed that said handle is held in its closed circuit position by the force applied to said face by said switch member, and said face terminating in a shoulder about which said switch member pivots to its open position when released by said current responsive device, said handle being moved thereby to its open circuit position by the force applied to said shoulder by said switch member.

8. A circuit breaker comprising a switch member, means mounting said switch member for pivotal movement about a plurality of points, a current responsive device normally securing one end of said switch member, a spring biasing said switch member to an open circuit position about said end as a pivot, and a pivotally mounted handle having a face movable into engagement with said switch member to thereby move said switch member to a closed circuit position against the force of said spring, said face being so disposed that a force applied perpendicularly thereto at some point passes through the pivot of said handle, whereby said handle is secured in its closed circuit position by the force applied to said face by said switch member, and said face terminating in a shoulder about which said switch member pivots to its open position when released by said current responsive device, said handle being moved thereby to its open circuit position by the force applied to said shoulder by said switch member.

9. A circuit breaker comprising an elongated current carrying switch member, means mounting said switch member for pivotal movement about a plurality of points, a current responsive thermostat normally securing one end of said switch member, a switch contact carried by the other end of said switch member, a spring biasing said switch member to an open circuit position about said thermostat as a pivot, and a pivotally mounted handle having a plane face movable into engagement with said switch member to thereby move said switch member to its closed circuit position against the force of said spring, said face being so disposed that a force applied perpendicularly thereto at some point passes through the pivot of said handle, whereby said handle is secured in its closed circuit position by the force applied to said face by said switch member and said face terminating in a shoulder about which said switch member pivots to its open position when released by said thermostat, said handle being thereby thrown to its open circuit position by the force applied to said shoulder by said switch member.

10. A circuit breaker comprising a switch member, means mounting said switch member for pivotal movement about a plurality of points, a contact carried by a normally movable end of said switch member, a current responsive thermostat normally securing the other end of said switch member, a spring biasing said movable end to an open circuit position about said thermostat as a pivot, a handle engaging said switch member to move it between its open and closed circuit positions, said spring moving said switch member about said handle as a pivot to its open circuit position when said switch member is released by said thermostat and said handle being returned thereby to its open circuit position, a stop engaging the movable end of said switch member in its open circuit position and about which said spring moves said switch member to a position to be secured by said thermostat.

11. A circuit breaker comprising a switch member, means mounting said switch member for pivotal movement about a plurality of points, a contact carried by a normally movable end of said switch member, a current responsive device normally securing the other end of said switch member, a spring biasing said movable end to an open circuit position about said current responsive device as a pivot, a handle engaging said switch member to move it between its open and closed circuit positions, said spring moving said switch member about said handle as a pivot to its open circuit position when said switch member is released by said current responsive device, a stop engaged by the movable end of said switch member in its open circuit position and about which said spring moves said switch member to a position to be secured by said current responsive device, and a spring strip secured to said switch member and having a portion in spaced relation with said switch member forming a bearing surface for said handle.

12. A circuit breaker comprising a switch member, means mounting said switch member for pivotal movement about a plurality of points, a contact carried by a normally movable end of said switch member, a current responsive device normally securing a normally fixed end of said switch member, a spring biasing said movable end of said switch member to an open circuit position about said fixed end as a pivot, and a pivotally mounted handle having a face movable into engagement with said switch member to thereby move said switch member to a closed circuit position against the force of said spring, said face being so disposed that a force applied perpendicularly thereto at some point passes through the pivot of said handle, whereby said handle is secured in its closed circuit position by the force applied to said face by said switch member, and said face terminating in a shoulder about which said switch member pivots to its open position when released by said current responsive device, said handle being moved thereby to its open circuit position by the force applied to said shoulder by said switch member, a spring strip secured to said switch member and having a portion in spaced relation with said switch member forming a bearing surface for said handle, and a stop engaged by the movable end of said switch member in its open circuit position and about which said spring moves said switch member after said switch member is released by said current responsive device to a position to be secured by said thermostat.

13. A circuit breaker comprising an elongated electrically conducting switch member, a projection on said member at an intermediate point thereof, a support for said switch member provided with a guide for said projection extending transversely with respect to said switch member, circuit control means operated by a movable end of said switch member, a current responsive device normally securing the other normally fixed end of said switch member, a spring bearing on said switch member at an intermediate point thereof for biasing said switch member to an open circuit position about said current responsive device as a pivot, an operating member engaging said switch member at a point between said spring and said normally fixed end of said switch member for moving said switch member between its open and closed circuit positions, said spring moving said switch member about said operating member as a pivot to its open circuit position when said switch member is released by said current responsive device, and a stop engaged by said switch member at a point between said spring and said movable end when said switch member is in its open circuit position, said operating member being moved to its open circuit position by said switch when said switch member is released by said current responsive device whereupon said spring moves said switch member about said stop as a pivot to a position to be secured by said current responsive device.

14. A circuit breaker comprising an elongated electrically conducting switch member, a projection on said member at an intermediate point thereof, a support for said switch member provided with a guide for said projection extending transversely with respect to said switch member, a switch contact carried on a movable end of said switch member, a current responsive device normally securing the other normally fixed end of said switch member, a spring bearing on said switch member at a point adjacent said projection and having its line of force parallel with said guide for biasing said switch member to an open circuit position about said current responsive device as a pivot, a handle engaging said switch member at substantially the center thereof and at a point between said projection and said normally fixed end for moving said switch member between its open and closed circuit positions, said spring moving said switch member about said handle as a pivot to its open circuit position when said switch member is released by said current responsive device, and a stop engaged by said switch member at a point between said projection and said movable end when said switch member is in its open circuit position, said handle being moved to its open circuit position by said switch member when said switch member is released by said current responsive device whereupon said spring moves said switch member about said stop as a pivot to a position to be secured by said current responsive device.

15. A circuit breaker comprising an elongated electrically conducting switch member, a pin extending transversely through said member at a point near its center, a support for said switch member provided with guides for the ends of said pin extending transversely with respect to said switch member, a movable switch contact carried on a movable end of said switch member nearer said guide pin, a cooperating stationary contact, a current responsive thermostat securing the other normally fixed end of said switch member, a spring bearing on said switch member at a point adjacent said guide pin and having its line of force parallel with said guides for biasing said switch member to an open circuit position about said current responsive device as a pivot, a handle engaging said switch member at substantially the center thereof and at a point between said guide pin and said normally fixed end for moving said switch member between its open and closed circuit positions, said spring moving said switch member about said handle as a pivot to its open circuit position when said switch member is released by said thermostat, and a stop engaged by said switch member at a point between said guide pin and said movable end when said switch member is in its open circuit position, said handle being moved to its open circuit position by said switch member when said switch member is released by said thermostat whereupon said spring moves said switch member about said stop as a pivot to a position to be secured by said thermostat, and a spring strip secured to said switch member and having a portion in spaced relation with said switch member forming a bearing surface for said handle whereby said movable switch is resiliently held in engagement with said fixed contact when said switch member is in its closed circuit position.

16. A circuit breaker comprising a switch member, means mounting said switch member for pivotal movement about a plurality of points, a current responsive device normally securing one end of said switch member, a spring biasing said switch member to an open circuit position about said end as a pivot, and a pivotally mounted handle having a face movable into engagement with said switch member to thereby move said switch member to a closed circuit position against the force of said spring, said face being so disposed that said handle is secured in its closed position by the force applied to said face by said switch member, and said face terminating in a shoulder about which said switch member pivots to its open position when released by said current responsive device, said handle being moved thereby toward its open circuit position by the force applied to said shoulder by said switch member, a projection on said switch member, and an extension member on said handle engaging said projection to hold said handle in a position intermediate said closed and open circuit positions when said switch member is released by said current responsive device.

17. A circuit breaker comprising a switch member, a handle, means pivotally mounting said handle, means biasing said switch member against said handle, said handle being provided with a projection for engagement with said switch member in dependence upon the position of said handle, current responsive means securing one end of said switch member whereby movement of said handle moves said switch member about said secured end between closed and open circuit positions, said switch member when released by said current responsive means being moved by said spring about said projection to its open circuit position whereby said handle is moved toward its open circuit position, a projection on said switch member, and a resetting member on said handle engaging said projection to hold said handle in an intermediate position when said switch member is released by said current responsive means, said resetting member cooperating with said switch member upon movement of said handle to its open circuit position to return said fixed end to a position to be secured by said current responsive means.

18. A circuit breaker comprising a floating switch member, a contact cooperating with one end of said switch member, a current responsive thermostat normally securing the other normally fixed end of said switch member, a spring biasing said switch member to an open position about said thermostat as a pivot, a handle of electrically insulating material, means pivotally mounting said handle at a point intermediate the ends of said switch member and in the path of movement of said switch member, said handle being provided with a projection for engagement with said switch member in dependence upon the position of said handle to thereby move said switch member between its open and closed circuit positions, said switch member when released by said thermostat being moved by said spring about said handle as a pivot to its open circuit position whereby said handle is moved toward its open circuit position, a projection on said switch member, and a resetting member on said handle engaging said projection to hold said handle in an intermediate position when said switch member is released by said thermostat, said resetting member cooperating with said switch member upon movement of said handle to its open circuit position to return said fixed end to a position to be secured by said thermostat.

19. A circuit breaker comprising a switch member, a contact cooperating with one end of said switch member, a current responsive thermostat normally securing the other fixed end of said switch member, a spring biasing said switch member to the open position about said thermostat as a pivot, a handle, means pivotally mounting said handle at a point intermediate the ends of said switch member and in the path of movement of said switch member, said handle being provided with a projection arranged for engagement with said switch member in dependence upon the position of said handle to thereby move said switch member between its open and closed circuit positions, said switch member when released by said thermostat being moved by said spring about said handle to its open circuit position whereby said handle is moved toward its open circuit position, a projection on said switch member, and a resetting member on said handle closely encircling said switch member to form a guide therefor and engaging said projection to hold said handle in a position intermediate said closed and open circuit positions when said switch member is released by said thermostat, said resetting member engaging said switch member upon movement of said handle to its open circuit position to return said fixed end to a position to be secured by said thermostat.

20. The combination with a plurality of circuit breakers each provided with an operating handle arranged to move to an open circuit position when the circuit breaker opens in response to the current passing therethrough, of means securing said breakers together in side by side relation with the pivots of said handles on a substantially common axis and said handles movable together between the closed and open circuit positions, a common actuating member for said handles pivotally mounted between said handles, and a pair of flanges on each side of said actuating member loosely embracing said handles respectively so that when one of said circuit breakers opens in response to current the handle of that breaker is free to move through a limited angle toward its open circuit position.

21. The combination with a plurality of circuit breakers each provided with an operating handle arranged to move to an open circuit position when the circuit breaker opens in response to the current passing therethrough with a force less than the force holding the handle in the closed position when the breaker is closed, of means securing said breakers together in side by side relation with the pivots of said handles on a substantially common axis and said handles movable in parallel relation between the closed and open circuit positions, a common actuating member for said handles pivotally mounted between said handles, a head on said actuating member overlapping the ends of said handles, and a pair of flanges on each side of said actuating member loosely embracing said handles respectively so that when one of said circuit breakers opens in response to current the handle of that breaker is free to move through a limited angle toward its open circuit position until brought to rest by the other handle through the connection therewith afforded by said actuating member.

22. The combination with a plurality of circuit breakers each provided with an operating handle arranged to move to an open circuit position when the circuit breaker opens in response to the current passing therethrough, of means securing said breakers together in side by side relation with the pivots of said handles on a common axis and said handles movable in parallel relation between the closed and open circuit positions, a common actuating member for said handles pivotally mounted between said handles, a pair of flanges on each side of said actuating member loosely embracing said handles respectively, and yieldable means cooperating with said actuating member and said handles for normally holding said handles in predetermined central positions with respect to said actuating member so that when one of said circuit breakers opens in response to current the handle of that breaker is free to move through a limited angle toward its open circuit position.

23. A circuit breaker comprising a switch member, means mounting said switch member for pivotal movement about a plurality of points between open and closed circuit positions, a current responsive device normally securing a point of said switch member, a spring biasing said switch member to one of said positions about said point as a pivot and a pivoted handle having a protection engaging said switch member to move said switch member about said point between said positions, said spring moving said switch member about said projection as a pivot to its open circuit position when said switch member is released by said current responsive device and said handle being returned thereby to its open circuit position.

24. A circuit breaker comprising a switch member, means mounting said switch member for pivotal movement about a plurality of points between open and closed circuit positions, a current responsive device normally securing one end of said switch member, a spring biasing said switch member to its open circuit position about said end as a pivot and an operating member having a projection movable into engagement with said switch member to thereby move said switch member to its closed circuit position against the force of said spring, said operating member being held in its closed circuit position by said switch member, said spring moving said switch member about said projection as a pivot to its open circuit position when said switch member is released by said current responsive device and said operating member being returned thereby to its open circuit position by the force applied thereto by said switch member.

25. A circuit breaker comprising a switch member, means mounting said switch member for pivotal movement about a plurality of points between open and closed circuit positions, a current responsive device normally securing one end of said switch member, a spring biasing said switch member to its open circuit position about said end as a pivot and a pivoted operating member having a projection movable into engagement with said switch member to a position between said switch member and the pivot of said operating member to thereby move said switch member to its closed circuit position against the force of said spring, said projection being thereby held between said switch member and the pivot of said operating member and said spring moving said switch member about said projection as a pivot to its open circuit position when said switch member is released by said current responsive device and said projection being thereby biased to return said operating member to its open circuit position by the force applied thereto by said switch member.

26. A circuit breaker comprising a switch arm, means mounting said switch arm for pivotal movement about a plurality of points between open and closed circuit positions, a current responsive device normally securing one end of said switch arm, a spring biasing said switch arm to its open circuit position about said end as a pivot, a pivoted operating handle having a projection moveable into engagement with said switch arm to thereby move said switch arm to its closed circuit position against the force of said spring, said operating handle being held in a closed circuit position by said switch arm and said spring moving said switch arm about said projection as a pivot to its open circuit position when said switch arm is released by said current responsive device, and guide means controlling the longitudinal position of said switch arm so that said switch arm moves about said projection into engagement with a different portion thereof to apply a force to move said handle to its open circuit position.

27. The combination with a plurality of automatic circuit breakers, each provided with a pivoted operating handle biased to move to an open circuit position when the circuit breaker opens automatically in response to the current passing therethrough, of means securing said breakers in side by side relation so that said handles are movable together between the closed and open circuit positions, a common actuating member for said handles, pivot means independent of said handles for pivotally mounting said actuating member between said handles and connecting means between said common actuating member and said handles providing for limited movement of each handle toward open position independently of the other handle to thereby indicate automatic opening of one of said circuit breakers.

28. The combination with a plurality of automatic circuit breakers, each provided with an operating handle biased to move to an open circuit position when the circuit breaker opens automatically in response to the current passing therethrough, of means securing said breakers together in side by side relation so that said handles may be moved together between the closed and open circuit positions, a common actuating member for said handles, means independent of said handles mounting said actuating member between said handles, a connection between said common actuating member and each of said handles providing for limited movement of the corresponding handle toward open position when one of said circuit breakers opens in response to current to thereby indicate such automatic opening, and resilient means yieldably connecting said actuating member with said handles for normally holding said handles in a predetermined relation with said actuating member.

29. The combination with a plurality of circuit breakers each provided with a pivoted operating handle arranged to move to an open circuit position when the circuit breaker opens automatically in response to the current passing therethrough, of means securing said breakers together in side by side relation with the pivots of said handles on a substantially common axis and so that said handles are movable together between the closed and open circuit positions, a common actuating member for said handles, a pivot for said common actuating member having an axis common with the pivot axis of said handles for mounting said common actuating member between said handles, and connecting means between said common actuating member and said handles providing for a limited movement of each handle toward the open circuit position independently of the other handle to thereby indicate the automatic opening of one of said circuit breakers.

30. In a circuit breaker, a contact, a bar whose movement controls movement of the contact and to which the contact is operatively connected, a handle and a spring arranged to bias the bar in opposite directions, and formation means on the bar arranged to be engaged by the handle whereby, in emergencies, the handle may be manipulated to pull the bar in the direction of the bias thereon of the spring.

31. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part.

32. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part, the handle being so constructed as to push or cam the part into "on" position when it is moved to "on" position, and to release the part for movement by the spring when it is moved out of "on" position.

33. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part, the handle being so constructed as to push or cam the part into "on" position when it is moved to "on" position, and to release the part for movement by the spring when it is moved out of "on" position, there being a formation on the part enabling it to be moved by the handle out of "trip" position and into "off" position, whereby, in the event the spring fails to move the part out of "trip" and into "off" position and fails to move the handle from "on" to "off" position, the handle may be manipulated so to do, by being moved from the "on" position to the "off" position.

34. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part, the actuated part comprising a floating bar having a latch connection at one end about which it pivots on normal handle actuation and adapted to be engaged by the handle between its ends.

35. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manualy, or when the handle is released, in case it was held manually during the overload release movement of the part, there being a formation on the part enabling it to be moved by the handle out of "trip" position and into "off" position, whereby, in the event the spring fails to move the part out of "trip" and into "off" position and fails to move the handle from "on" to "off" position, the handle may be manipulated so to do, by being moved from the "on" position to the "off" position.

36. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part, the handle being so constructed as to push or cam the part into "on" position when it is moved to "on" position, and to release the part for movement by the spring when it is moved out of "on" position, the actuated part comprising a floating bar having a latch connection at one end about which it pivots on normal handle actuation and adapted to be engaged by the handle between its ends.

37. An automatically releasing circuit breaker having an actuated part, a spring biasing means and an overload latch therefor, and a handle for moving the part to and from "on" and "off" positions and for relatching the part after an overload release thereof, the parts being so arranged that on an overload release of the latch, the spring moves the part out of "on" position, and into a "trip" position, trip free of the handle, and then moves the part into "off" position and the handle out of "on" position, if the handle is not held manually, or when the handle is released, in case it was held manually during the overload release movement of the part, the handle being so constructed as to push or cam the part into "on" position when it is moved to "on" position, and to release the part for movement by the spring when it is moved out of "on" position, there being a formation on the part enabling it to be moved by the handle out of "trip" position and into "off" position, whereby, in the event the spring fails to move the part out of "trip" and into "off" position and fails to move the handle from "on" to "off" position, the handle may be manipulated so to do, by being moved from the "on" position to the "off" position, the actuated part comprising a floating bar having a latch connection at one end about which it pivots on normal handle actuation and adapted to be engaged by the handle between its ends.

38. A circuit breaker comprising a switch member, means mounting said switch member for pivotal movement about a plurality of points between open and closed circuit positions, a current responsive device normally securing a point of said switch member, a spring biasing said switch member to one of said positions about said point as a pivot, a pivoted handle having a projection engaging said switch member to move said switch member about said point between said positions, said spring moving said switch member about said projection as a pivot to its open circuit position when said switch member is released by said current responsive device and said handle being returned thereby to its open circuit position, a stop engaged by the movable end of said switch member about which said spring moves said switch member to a reset position to be secured by said current responsive device, and actuating means on said handle cooperating with said switch member to reset said switch member in the event said spring fails to reset said switch member.

39. A circuit breaker comprising an electrically conducting switch member, means mounting said switch member for pivotal movement about a plurality of points, a current responsive device normally securing one end of said switch member, a contact carried by the other end of said switch member, electrical connections connecting said switch member in the circuit of the breaker, spring means biasing said switch member to an open circuit position about said current responsive device as a pivot, a handle made of electrically insulating material engaging said switch member to move it between its open and closed circuit positions, said spring moving said switch member about said handle to its open circuit position when said switch member is released by said current responsive device and said handle being returned thereby to its open circuit position, a stop engaged by the movable end of said switch member and about which said spring moves said switch member to a reset position to be secured by said current responsive device, and actuating means on said handle cooperating with said switch member to hold said handle in an intermediate position in the event said spring fails to move said switch member to said reset position and for resetting said switch member when said handle is moved to its open circuit position.

FRED G. VON HOORN.